United States Patent
Hosier et al.

(10) Patent No.: US 6,853,402 B2
(45) Date of Patent: Feb. 8, 2005

(54) COMBINED MULTIPLEXING AND OFFSET CORRECTION FOR AN IMAGE SENSOR ARRAY

(75) Inventors: Paul A. Hosier, Rochester, NY (US); Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 810 days.

(21) Appl. No.: 09/774,208

(22) Filed: Jan. 30, 2001

(65) Prior Publication Data

US 2002/0101522 A1 Aug. 1, 2002

(51) Int. Cl.[7] .......................... H04N 5/217; H04N 9/64; H04N 5/335; H04N 5/228
(52) U.S. Cl. ...................... 348/241; 348/244; 348/307; 348/222.1
(58) Field of Search ................................. 348/241, 244, 348/245, 243, 533, 302, 264, 307, 222.1, 3.8; 250/208.1; 358/463, 483

(56) References Cited

U.S. PATENT DOCUMENTS

| | | | |
|---|---|---|---|
| 4,737,854 A | 4/1988 | Tandon et al. | 358/213.31 |
| 5,081,536 A | 1/1992 | Tandon et al. | 358/213.31 |
| 5,105,277 A | 4/1992 | Hayes et al. | 358/213.31 |
| 5,638,121 A * | 6/1997 | Hosier et al. | 348/312 |
| 5,654,755 A * | 8/1997 | Hosier | 348/245 |
| 6,002,435 A * | 12/1999 | Yamamoto et al. | 348/307 |
| 6,025,935 A * | 2/2000 | Tseng | 358/483 |
| 6,118,115 A * | 9/2000 | Kozuka et al. | 250/208.1 |
| 6,166,769 A * | 12/2000 | Yonemoto et al. | 348/308 |
| 6,252,217 B1 * | 6/2001 | Pyyhtia et al. | 250/208.1 |
| 6,445,413 B1 * | 9/2002 | Hosier et al. | 348/245 |
| 6,697,108 B1 * | 2/2004 | Chen et al. | 348/241 |

* cited by examiner

*Primary Examiner*—Andrew Christensen
*Assistant Examiner*—Lin Ye
(74) *Attorney, Agent, or Firm*—R. Hutter (57) ABSTRACT

A photosensitive device, such as would be found in a digital scanner or camera, includes at least two sets of photosensors, the video signals from which are multiplexed together. While the two video paths are separate, before the multiplexing step, an offset correction process is carried out on each video path. After multiplexing, a final offset correction process is carried out to the combined signals, to remove offsets associated with the combined video path.

14 Claims, 6 Drawing Sheets

COMBINED MULTIPLEXING AND OFFSET CORRECTION FOR AN IMAGE SENSOR ARRAY

INCORPORATION BY REFERENCE

The present application incorporates by reference U.S. Pat. Nos. 5,638,121 and 5,654,755, both assigned to the assignee hereof.

FIELD OF THE INVENTION

The present invention relates to image sensor arrays used in raster input scanners. In particular, the invention relates to photosensitive chips wherein each photosensor outputs signals onto a common video line, and where there is provided dark photosensors for setting an offset level on the common video line.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging without reductive optics. In order to provide such a "full-width" array, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are readout from the photosensors on a chip to be converted to digital data, different video levels, corresponding to the brightness of the reflected area being scanned by a particular photosensor at a particular moment, are output as a series of analog voltage levels.

Photosensitive devices may be one-dimensional or two-dimensional, and can be either of the "active" variety, wherein the photosensors output voltage signals, or in the form of a charge-coupled device, or CCD, which outputs a sequence of charges from a series of individual photosensors. In all of these various types of photosensitive devices, a common design feature is the use of "dark" photosensors, which are used to periodically reset the offset voltage for the photosensors being read out. These dark photosensors are of the same semiconductor structure as the other "active" photosensors on each chip, but the dark photosensors are not exposed to light. In most designs, the dark photosensors are provided with an opaque shield, such as of aluminum or silicon, to prevent the influence of light thereon. In the scanning process, with each readout cycle of active photosensors on each chip, the readout of the first photosensor is proceeded by readouts of one or more dark photosensors, which are used to reset the voltage offset associated with the whole chip, and thereby correct signal drift when the active photosensors are reading out their signals. In other words, the readout of a dark photosensor with each scan can serve as a reference offset or "zero point" so that the absolute values of light intensity on the active photosensors may be determined. The use of a dark photosensor output when reading out signals from active photosensors can significantly compensate for performance variations of multiple chips in a single apparatus, and also for changes in the performance of a photosensitive device over time.

With any sophisticated system for reading out images signals from a series of photosensors, a common practical problem is known as "fixed-pattern noise." With each individual photosensor for an associated transfer circuit, there is likely to be a single dedicated amplifier. Given the practicalities of constructing photosensors and circuits on a chip, it is likely that certain amplifiers, associated with certain photosensors, will consistently have higher output relative to other amplifiers associated with other photosensors. There exist basic techniques for overcoming fixed pattern noise, such as mentioned in U.S. Pat. No. 5,654,755, which will be described in detail below.

In order to increase the readout speed of image signals from, for example, a linear array of photosensors, it is known to provide a separate "odd" and "even" channels for the output of image signals. A basic example of this technique is shown in U.S. Pat. No. 5,638,121. In brief, odd and even photosensors along a linear array respectively output image signals into separate video lines, and these video lines are subsequently multiplexed downstream, thus yielding a single video stream representative of both odd and even video lines. As a practical matter, it has been found that such a design may exhibit a "video path offset" distortion effect caused by the fact that, where the odd and even video lines are separate, the odd and even video paths each go through a different set of amplifiers and are thus consistently given slightly different levels of amplification.

The present invention is directed toward a readout system for video signals in which multiple video lines are multiplexed, in a matter which eliminates both fixed pattern of noise and video path offset.

DESCRIPTION OF THE PRIOR ART

U.S. Pat. Nos. 4,737,854; 5,081,536; and 5,105,277 show aspects of a preferred architecture for a photosensor chip particularly suitable for use with the present invention.

U.S. Pat. No. 5,638,121 discloses a CMOS-based image sensor array in which odd and even photosensors in a linear array respectively output video into separate video channels. The two video channels are eventually multiplexed to yield a single data stream.

U.S. Pat. No. 5,654,755 discloses a photosensitive device wherein voltages are read sequentially from a dark, or dummy, photosensor and a plurality of active photosensors with each of a series of scans. A circuit downstream of the photosensors resets the offset value of the voltage signals, based on successive voltage readings from the dark photosensor. An RC circuit in parallel with the video line maintains a running average of readings from the dark photosensor over a large number of scans. This averaging of many dark-pixel readings averages out short-term thermal noise on the dark photosensor, for a truer offset value.

It is known in the prior art to use a sample-and-hold circuit on each video path immediately before multiplexing two video paths, in order to allow pixel amplifiers associated with photosensors on each video path to operate more slowly (thus enabling relatively small, low-power amplifiers to be used) than the multiplexed video signals.

SUMMARY OF THE INVENTION

According to one aspect of the present invention there is provided a photosensitive apparatus, comprising a first video line, having associated therewith a first set of active photosensors, each active photosensor outputting a signal representative of light intensity thereon onto the first video line. A first correction capacitor, associated with the first video line, retains a correction charge thereon to influence the voltage signals from the active photosensors on the first video line. A second video line has associated therewith a second set of active photosensors, each active photosensor outputting a signal representative of light intensity thereon onto the second video line. A second correction capacitor associated with the second video line retains a correction charge thereon to influence the voltage signals from the active photosensors on the second video line. A multiplexing node accepts voltage signals from the first video line and the second video line. Final correction means perform an offset correction operation on signals downstream of the multiplexing node.

According to another aspect of the present invention, there is provided a method of operating a photosensitive apparatus. The apparatus comprises a first video line, having associated therewith a first set of active photosensors, each active photosensor outputting a signal representative of light intensity thereon onto the first video line, a second video line, having associated therewith a second set of active photosensors, each active photosensor outputting a signal representative of light intensity thereon onto the second video line, and a multiplexing node, accepting signals from the first video line and the second video line. The method comprises the steps of performing a first offset-correction operation on signals on the first video line, performing a second offset-correction operation on signals on the second video line, and, following the first and second offset-correction operations, multiplexing the signals on the first video line and the second video line at the multiplexing node.

DETAILED DESCRIPTION OF THE INVENTION

The following description relating to FIGS. 1–4 of the present application is adapted from the disclosure in U.S. Pat. No. 5,654,755, incorporated by reference above. Further detail about the structure in these Figures, and the operation thereof, may be found in the referenced patent. In all Figures herein, like reference numerals indicate analogous elements in various embodiments.

Figure 1:
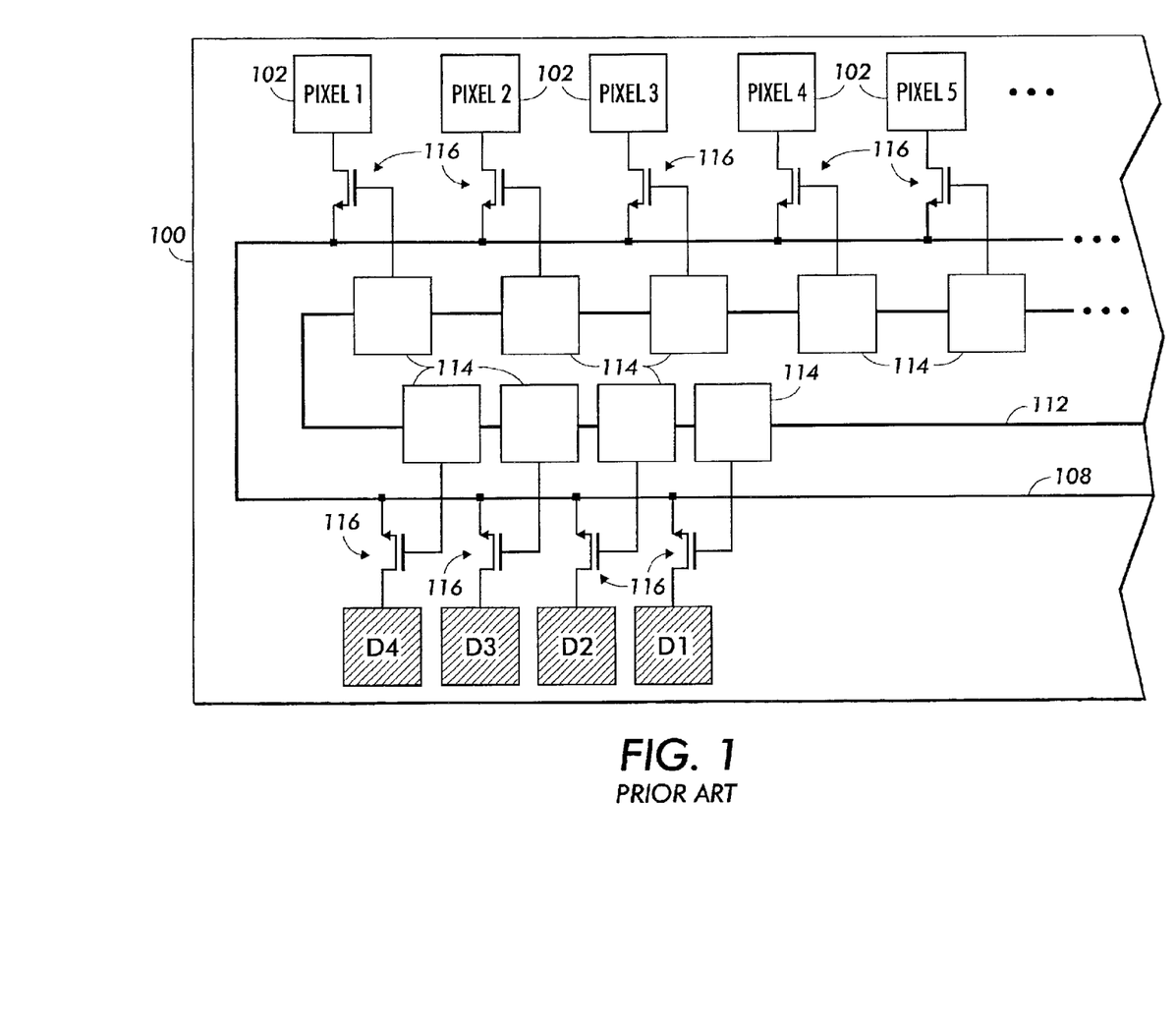
FIG. 1 is a plan view of the relevant portions of an active photosensitive device having dark photosensors and active photosensors reading to a common video line, as known in the prior art.

FIG. 1 is a simplified plan view showing a configuration of photosensors on a single active photosensor chip 10, as generally known in the prior art. Such a chip would be found, for example, in a raster input scanner (RIS) having a linear array of photosensors, as would be used, for example, in a digital copier or scanner. In the plan view of FIG. 1, there is shown a long array of active (i.e., photosensitive) photosensors 102 which share a common video line 108 with a plurality of "dark photosensor" photosensors 110, which are individually indicated as D1–D4. Also associated with the photosensors 102 and 110 is a shift register line 112 which connects a series of shift register select switches 114. The shift register select switches 114 have associated therewith a series of transistor switches 116. When each transistor switch 116 is activated, the transistor switch permits the charge from its associated individual photosensor 102 or 110 to be readout through the switch 116 onto the common video line 108. There is thus run through the line of shift register switches 114 on line 112 digital information in the form of a string of O's with a single "1" therein. As the string of digits moves through the shift register switches 114 along line 112, the single "1" activates the photosensors in a sequence as it moves down the input line 112, thereby causing the photosensors 108 and 102 to output the signals thereon, in order, onto video line 108.

In the particular design of FIG. 1, the first photosensors to be activated with each scan are the dark photosensors 110, followed by the active photosensors 102. As mentioned above, the dark photosensors 110 are typically of the same general structure as the active photosensors 102, except that they are not exposed to light in any way. Typically, the dark photosensors 110 are shielded from light, such as with a layer of aluminum. Because both the dark photosensors 110 and active photosensors 102 are created in the same chip, they will be as physically similar as possible, so that any systemic process variation or parasitic effect of the active photosensors 102 will be equally apparent in the dark photosensors 110. In this way, with each scan of video signals the dark photosensors in effect recalibrate the chip by establishing a video signal consistent with no light impinging on a photosensor. Once this offset is determined, systemic errors in the outputs of the active photosensors can be compensated for.

Figure 2:
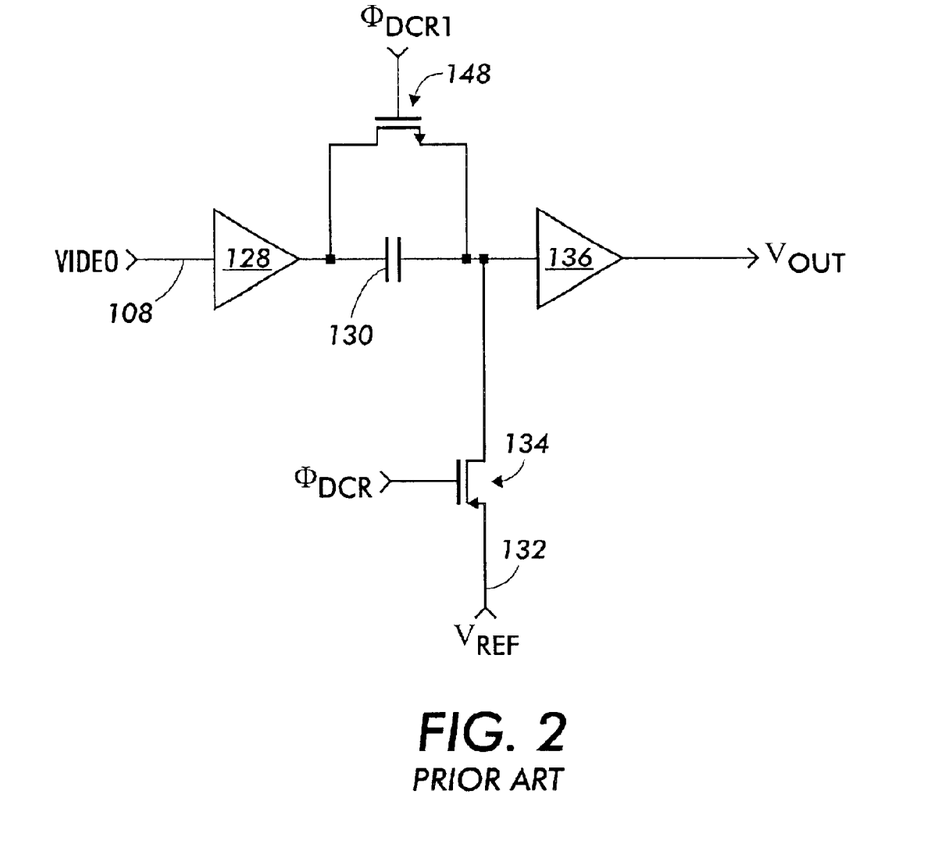
FIG. 2 is a schematic diagram of a simple prior-art circuit for causing dark photosensor signals to determine an offset for subsequent active photosensor video signals.

A simple prior-art apparatus for causing the dark photosensors to determine the offset for the active photosensor which are subsequently read out on video line 108 is shown in FIG. 2. The circuit shown in FIG. 2 is intended to be immediately downstream of the active photosensors on video line 108. Following passage through a unity-gain amplifier 128, there is provided on video line 108 a capacitor 130, which will specifically be referred to as "correction capacitor" 130. Correction capacitor 130 retains a charge thereon which influences the magnitude of voltage signals from active photosensors which are read out through video line 108. Because of the relatively high speeds of reading out active photosensors with each scan, the charge on correction capacitor 130 will remain reasonably constant through every readout sequence. In order to place an original charge on correction capacitor 130, that is, a charge on correction capacitor 130 which will influence the magnitude of voltage signals in a desirable manner, the correction charge on correction capacitor 130 is fixed with every scan when the dark photosensors 116 are read through video line 108.

In a typical embodiment of a chip such as 100 with four dark photosensors 110, the selection of four dark photosensors is mandated mainly by standard engineering practice; typically, only one such dark photosensor, such as dark photosensor D3, is used to determine the offset for the subsequent readout of active photosensors. At the beginning of each readout, when it is the turn of dark photosensor D3 to output its dark photosensor signal onto video line 108, a reference voltage, from a source 132 in parallel to the video line 108, is activated, such as through a switch 134. The output of the dark photosensor D3 of dark photosensors 110, simultaneous with the application of reference voltage $V_{REF}$ on the other side of correction capacitor 130, has the effect of placing on correction capacitor 130 a charge, referred to as the "correction charge," representative of both the dark photosensor signal and $V_{REF}$. There may also be other circuits along video line 108, which are here summarized as the influence of an extra unity gain amplifier, indicated as 136.

As soon as dark photosensor D3 of dark photosensors 110 has output its dark signal onto video line 108 the transistor 134 goes low, shutting off $V_{REF}$ on video line 108, and leaving a residual correction charge on correction capacitor 130. Henceforth, for all subsequent signals on video line 108 until the next operation on dark photosensor D3, the output of $V_{OUT}$ on video line 108 is:

$$V_{OUT} = (V_n - V_{D3} + v_{na} + v_{nd}) + V_{REF} + V_{OS}$$

where $V_n$=the output of an active photosensor n; $v_{na}$= active photosensor noise; $v_{nd}$=dark photosensor noise; $V_{D3}$= the voltage signal from dark photosensor 3; and $V_{OS}$=the offset contributed by other circuitry, symbolized by unity gain amplifier 136. The signal from dark photosensor 3 will, through correction capacitor 130, influence the magnitude of all voltage signals from the active photosensors 102 through the whole scan. In this FIG. 2 embodiment, the particular influence of $V_{D3}$ will last only until the next scan when dark photosensor D3 is again caused to set the charge on correction capacitor 130.

Figure 3:
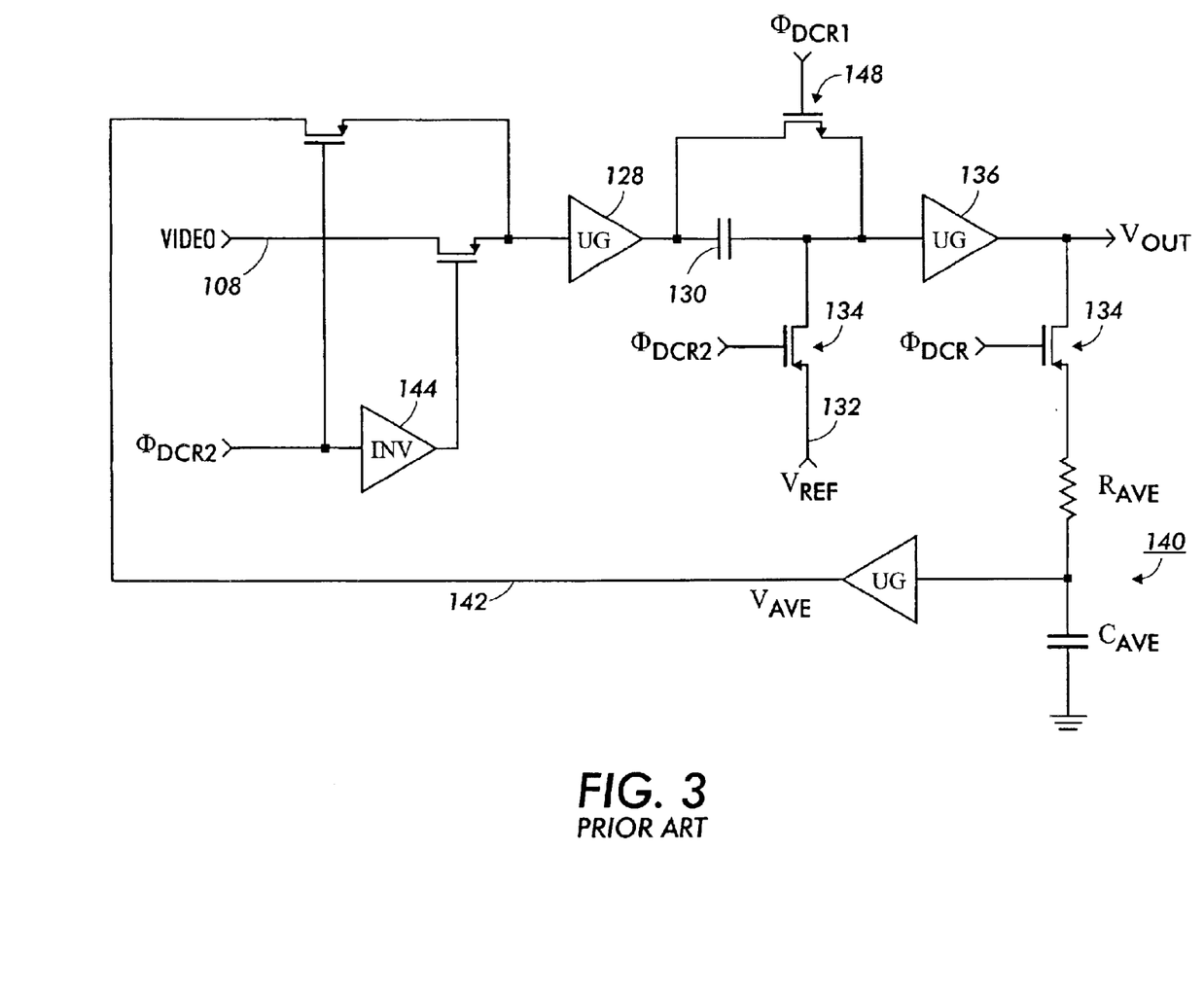
FIG. 3 is a schematic diagram of a prior-art circuit for determining an offset for a video line from dark photosensor signals.

FIG. 3 is a schematic diagram of a simple embodiment of a dark photosensor offset circuit according to the present invention. It will be noted that the circuit of FIG. 3 shares key similarities with the simple circuit of FIG. 2: the circuit of FIG. 3 is disposed at the end of the video line 108, so as to receive signals from both the dark photosensors 110 and the active photosensors 102. There is also a unity gain amplifier 128, and correction capacitor 130 on the video line. As in the FIG. 2 circuit, a reference voltage $V_{REF}$ is available to the video line 108 through transistor 134.

A significant feature of the embodiment of FIG. 3 is an RC circuit, indicated as 140, in parallel with the video line 108. This RC, in turn, is connected through an average voltage line 142 (which may include a unity-gain amplifier as shown), to selectably apply an average voltage $V_{AVE}$ to the video line 108 when activated by switching means 144. There is also provided in the circuit of FIG. 3 a bypass switch 148, which, as shown, causes correction capacitor 130 to be bypassed on video line 108 when a voltage is applied thereto.

In the circuit of FIG. 3, various inputs are applied to the various repeatedly over many cycles of operation, such as the switch in RC circuit 140 associated with switching means 144 and bypass switch 148, in a manner described in detail in the '755 patent incorporated by reference. When dark photosensor D2 and dark photosensor D3 of dark photosensors 110 are reading out their signals onto video line 108, it can be seen that $\phi_{DCR}$ and $\phi_{DCR1}$ go high: $\phi_{DCR}$ connects RC circuit 140 to video line 108, and $\phi_{DCR1}$ activates bypass switch 148, which causes the signal on video line 108 to bypass correction capacitor 130. ("DCR" stands for "DC restore.") Thus, when dark photosensor D2 and dark photosensor D3 are readout on video line 108, their signals pass through video line 108, through bypass switch 148, and contribute charge to the RC circuit 140.

The RC circuit 140 functions as an averaging circuit which samples the video from both the dark photosensor D2 and dark photosensor D3 with every scan on video line 108. The values of R and C of the RC circuit 140 should be set so that samples of the video signals from dark photosensor D2 and dark photosensor D3 over a relatively large number of scans are accumulated. In other words, R and C provide a time constant by which the effect of numerous scans of dark photosensors D2 and D3 loaded onto the RC circuit 140 cause the RC circuit 140 to maintain a running average of the outputs of dark photosensors D2 and D3 over a large number of scanlines. For example, if it is desired to maintain a running average of 100 scanlines, then the value of RC should be set equal to 100 times the duration of the sample clock $\phi_{DCR}$ with each scan. Generally, for a practical embodiment of the ciurcuit in FIG. 3, the RC should be chosen to sample at least 10 scanlines, and preferably about 100 scanlines, in order to obtain its average dark photosensor signal.

Figure 4:
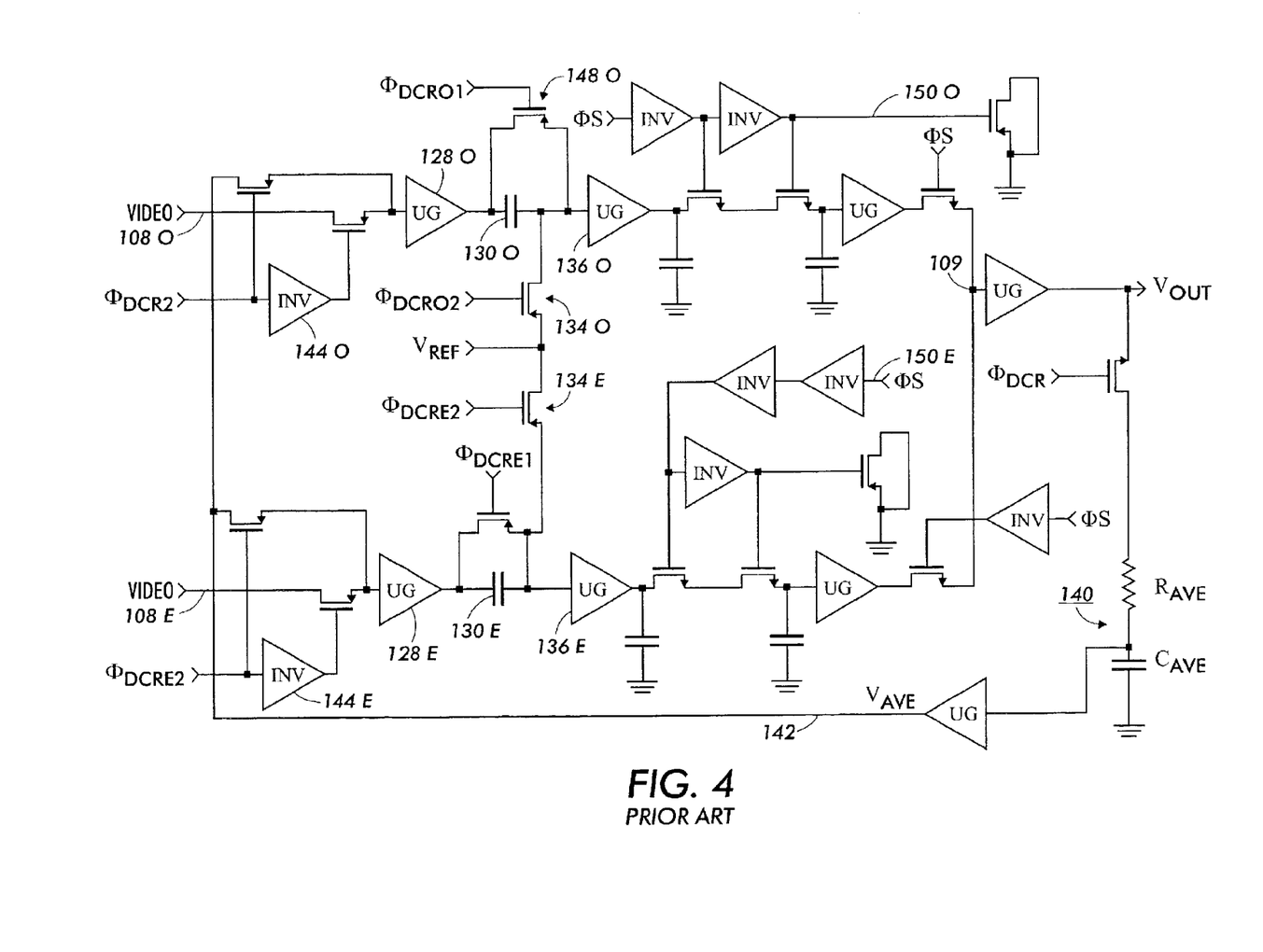
FIG. 4 is a schematic diagram of a prior-art circuit, generally similar to that of FIG. 3, adapted for use in a chip where video signals from different sets of active photosensors are multiplexed.

FIG. 4, which is identical to FIG. 5 in the '755 patent incorporated by reference, shows the offset-correction concept of FIG. 3 in the context of a device, such as generally shown in '121 patent incorporated by reference, wherein separate video lines are multiplexed to form a single video line. In FIGS. 3 and 4 herein, like reference numerals (as well as voltage inputs, such as DCR) indicate like elements, with a modification that reference numerals followed by the letter O are specific to the odd-signal line 108O, and reference numerals followed by E indicate elements which are specific to the even video line 108E. However, it will be noticed that certain elements in the FIG. 4 circuit, in particular RC circuit 140, line 142, and reference source 132, are common to both the odd and even video lines. Thus, the RC circuit 140 maintains a running average of dark photosensor signals of a combination of the dark photosensors on the odd video line 108O and also on the even video line 108E, even if, in certain embodiments, the two sets of dark photosensors are never otherwise connected. Also shown is an offset-removal circuit for each video line, indicated as 150O and 150E, which are peculiar to a particular practical embodiment. It will be noted that the function of circuits 150O and 150E can be used for multiplexing signals on the two separate video lines 112O and 112E onto a single output line, if $\phi_s$ is representative of the clock signal for each video signal being read through the video lines.

It has been found that the combination offset correction and multiplexing circuit shown in FIG. 4 herein is susceptible to what has been described above as "offset path noise." It can be seen, in FIG. 4, that the separate odd and even video lines 108E and 108O are treated separately by their respective correction circuits, such as correction capacitors 130E and 130O and unity gain amplifiers 136E and 136O before the two video streams are multiplexed at the multiplex node indicated as 109. Because the separate video patterns are treated separately and run through different circuits, any discrepancy in amplifier offset and gain or other characteristics will manifest themselves unequally in the odd and even video paths, causing distortions when the two video paths are multiplexed at multiplex node 109. It is an object of the present invention to provide a combination offset correction and multiplexing circuit which overcomes these and other problems.

Figure 5:
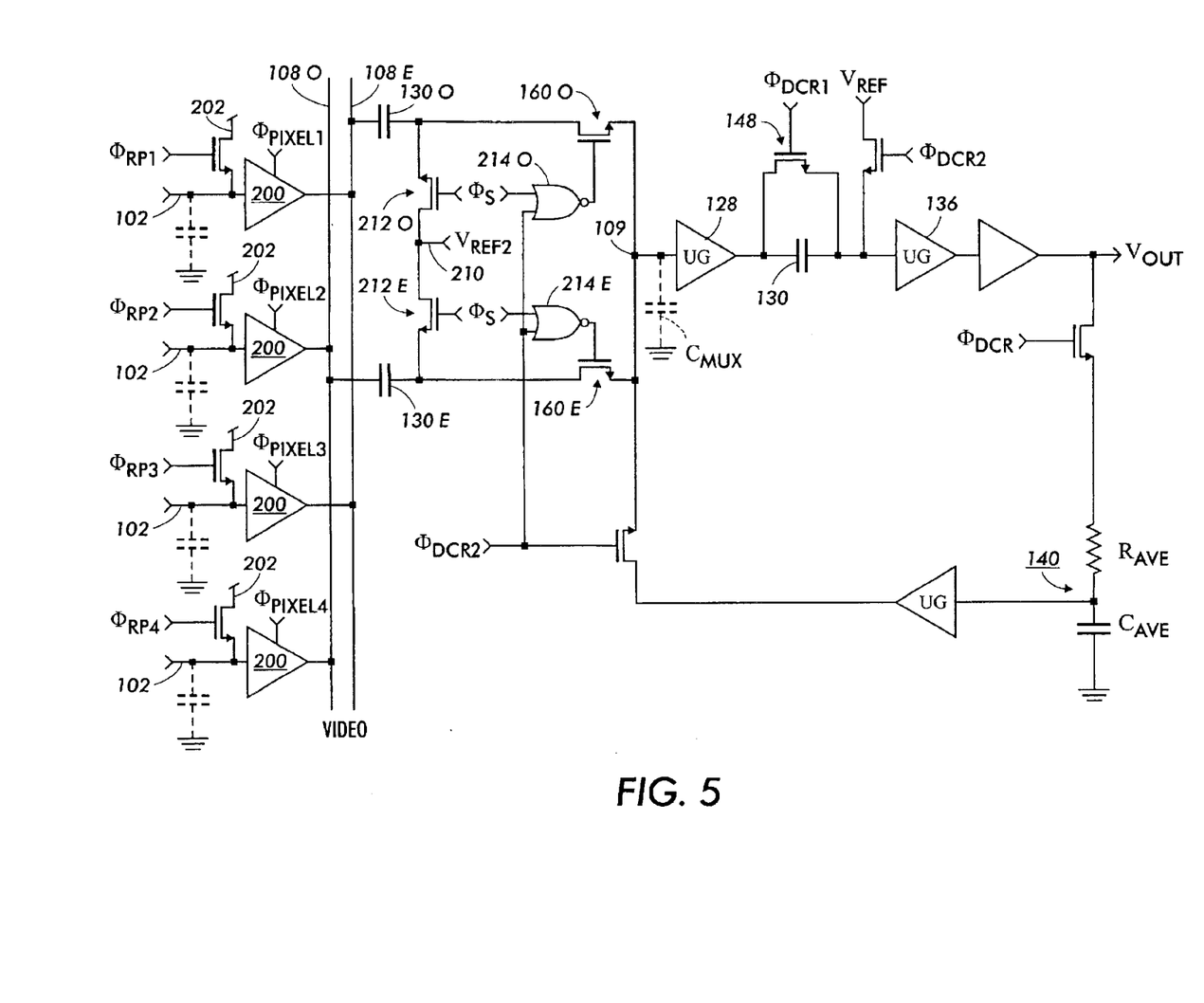
FIG. 5 is a schematic diagram of a multiplexing and offset correction circuit according to the present invention.
Figure 6:
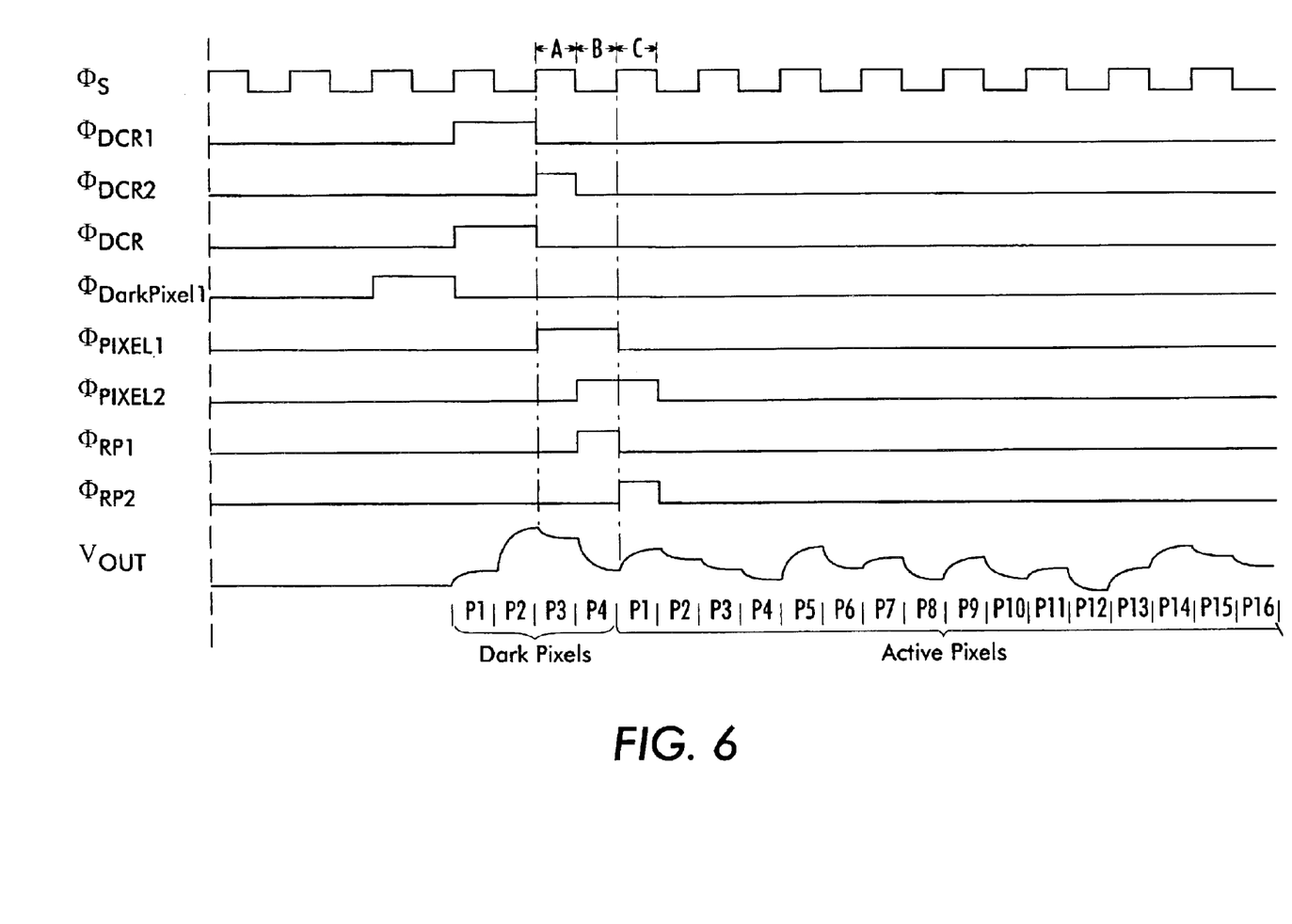
FIG. 6 is a comparative timing diagram showing the operation of the circuit of FIG. 5.

FIG. 5 is a schematic diagram showing a combination multiplexing and offset correction circuit according to the present invention. FIG. 6 is a set of comparative timing diagrams illustrating the operation of the circuit of FIG. 5. In FIG. 5, Reference numerals associated with various elements indicate elements analogous with similarly referenced elements in previous figures, and also in the '755 patent. Further, whereas certain elements in FIG. 5 are indicated by plain reference numerals such as 130, certain other elements having analogous functions but with reference to specific portions of the circuit are indicated as either even or odd, e.g., capacitor 130E has an analogous function on an "even" video line as has capacitor 130O on the "odd" video line, and also as capacitor 130 (which will be called the "main correction capacitor") on the multiplexed line.

Starting at the left of FIG. 5, image-related signals from the photosensors, such as shown that as 102 in FIG. 1 above, are at various times passed through what are shown as pixel amplifiers 200. Further, in the particular illustrated embodiment, each individual photosensor line 102 includes a reset transistor indicated as 202, the function of which will be described below. Each pixel amplifier 200, as can be seen, is independently actuable via a line which operates the amplifier. It will be understood that, although only four such photosensor lines 102 are shown in the Figure, there will be as many photosensor lines as there are photosensors in a particular device, and further, some of these photosensors will be "dark" or dummy photosensors, that is, shielded from light so as to output only a reference dark level, such as described with regard to FIG. 1 above. Further according to the illustrated embodiment, alternating sets of the photosensors 102 are attached to an even video line 108E and an odd video line 108O. It will be understood that, although the particular embodiment two sets of the photosensors 102 are disposed in alternating fashion within a device, the present invention can apply to any situation in which distinct sets of photosensors, such as belonging to differently-color-filtered sets of photosensors, provide signals which are at some point multiplexed.

Once signals from the two groups of photosensors are placed on video lines 108O and 108E respectively, the signals are multiplexed to form a single video stream. First, however, according to the present invention, each original (in this case, odd and even) video stream is independently offset-corrected; a reference charge is placed on a correction capacitor on each video line, and that charge is then used to correct (by removing the original offset charge from) subsequent video signals passing through the capacitor. As can be seen in FIG. 5, video line 108E includes a correction capacitor 130E thereon and odd video line includes a correction capacitor 130O. Ultimately, each line is fed, through the multiplexing procedure outlined below, to a common multiplexing node 109. Node 109 is further associated with an averaging and correction arrangement including a single common correction capacitor 130 (in this context, a "main correction capacitor") which is influenced by an averaging RC circuit 140: the portion of the illustrated circuit downstream of node 109 operates in the manner described in the '755 patent, in which RC circuit 140 maintains a running average of a large number of repeated readings from dark-pixel photosensors on the device, and uses this running average to determine the correction charge to remove offset from the multiplexed video stream passing through main correction capacitor 130, in what can be considered a "final" offset-correction operation.

The circuit of FIG. 5 further includes circuitry for carrying out the dual functions of multiplexing and offset correction. A node 210 accepts a reference voltage Vref2 from an external source: this reference voltage is used, as will be shown below, for the offset correction process. Node 210 is associated with two transistors 212O and 212E, which respond to complementary clock signals $\phi_s$ and $100_s$. to connect the reference signal to one or the other correction capacitors 130O and 130E. The clock signals $\phi_s$ and $\phi_{s^*}$ also operate, through NOR gates 214O and 214E, multiplexing transistors 160O and 160E, each of which, when activated, transfers charge from one or the other correction capacitor 130O or 130E to multiplexing node 109. The multiplexing node 109 has associated therewith a finite capacitance $C_{MUX}$.

Turning to the clock scheme of FIG. 6, the steps A–C show the action of various devices involved in the offset correction-multiplexing scheme of the present invention, with reference to an example odd photosensor. During time period A the signal, Vsig+Vdark (meaning, a voltage representing both the actual signal to be recorded, plus the undesirable offset which would be associated with the dark pixel level, and which therefore is desired to be subtracted from the signal), is read out of the first odd pixel amplifier 200 and forced on the left side of the odd offset correction capacitor 130O, which has a capacitance of $C_{oco}$ (offset correction, odd). During this same time period the $\phi_s$ actuated switch forces the reference voltage, Vref2, on the right side of capacitor 130O. Also during this time, the odd multiplexing transistor 160O is off and the voltage on multiplexing node 109 is determined by the even video path on line 108E.

During time period B, a reset pulse $\phi_{RP1}$ is actuated on the reset transistor 202 for a particular photosensor and the node associated with the photosensor is thus reset to its dark level. This dark level, Vdark, is read out and stored on the left side of capacitor 130O. Since the $\phi_s$ switch is off and the odd multiplexing transistor is on, the other side of the capacitor is forced to a level that is approximately equal to (Vref2+Vsig+Vdark)−Vdark, or simply Vref2+Vsig: in other words, the "dark" portion, or offset, of the signal is thus removed.

As a practical matter, since there is a finite amount of parasitic capacitance on the multiplexed node 109, there will be some capacitance division between the old signal and new signal. The resulting signal on the multiplexing node will be $C_{oco}/(C_{oco}+C_{Mux}) \times \text{Vsig} + C_{Mux}/(C_{oco}+C_{Mux}) \times \text{Vsigprev}$, where Vsigprev is the previous signal. This means the lag from one pixel to another will be $C_{MUX}/(C_{oco}+C_{MUX})$, which can be kept quite small, on the order of 3–7%. During time period B the signal, Vsig+Vdark, is read out of the first even pixel amplifier 200 in a similar manner as during time period A for the odd pixel.

Similarly, during time period C in FIG. 6, the signal from the first even pixel ends up on the multiplexing node 109, with a small residual lag from first odd pixel. It can also be seen that during periods B and C, the signals on the multiplexing node also show up on the sensor output, since there is no delay as would be introduced by, for example, a sample and hold circuit.

There are certain minor considerations and details that need attention for this scheme to work in the best possible way. All buffers or amplifiers need to settle in one-half of a $T_s$ period, that is, the high or low time of the $\phi_s$ or $\phi_s^*$ clock. The pixel reset pulse $\phi_{RP}$ for the odd or even photosensors 102 should be enabled after the $\phi_s$ or $\phi_s^*$ clocks are pulsed, to guarantee that the proper signal is stored on the correction capacitors 130O, 130E. In the circuit implementation, it is best to minimize $C_{MUX}$ to reduce fast scan video lag, such as caused by a residual signal from previously read-out pixel within a scan line]

The circuit according to the illustrated embodiment of the present invention provides the following practical advantages. The fixed pattern noise, or dark nonuniformity, due to variations of pixel amplifier offsets from pixel to pixel within a single video path is removed by the offset correction at the odd or even correction capacitor. Because N video paths are multiplexed together, the resulting chip video rate, or data rate, is N times higher compared to a nonmultiplexed circuit. This allows lower power/area or larger signal range in the pixel amplifiers running at slower speed, or faster video rate for pixel amplifiers running at the same speed. By multiplexing after offset correction, power and area is saved in the video paths by requiring fewer amplifiers than, for instance, the prior art circuit of FIG. 4 above (note how the circuit of the preferred embodiment requires no amplifiers between the correction capacitors 130O and 130E and the multiplexing node 109), and the fixed pattern noise of separate paths is eliminated. Although a small amount of lag is introduced with the circuit of the present invention, it can be kept minimal, and will not significantly degrade image quality.

What is claimed is:

1. A photosensitive apparatus, comprising:
   a first video line, having associated therewith a first set of active photosensors, each active photosensor outputting a signal representative of light intensity thereon onto the first video line;
   a first correction capacitor associated with the first video line, the correction capacitor adapted to retain a correction charge thereon to influence signals from the active photosensors on the first video line;
   at least one dark photosensor, the dark photosensor being adapted to receive no light thereon, outputting a reference signal onto the first video line;
   a second video line, having associated therewith a second set of active photosensors, each active photosensor outputting a signal representative of light intensity thereon onto the second video line;
   a second correction capacitor associated with the second video line, the correction capacitor adapted to retain a correction charge thereon to influence signals from the active photosensors on the second video line;
   a multiplexing node, accepting signals from the first video line and the second video line;
   final correction means for performing an offset correction operation on signals downstream of the multiplexing node, the final correction means including a main correction capacitor associated with the multiplexing node, the main correction capacitor retaining a correction charge thereon to influence the voltage signals from the active photosensors from the first video line and the second video line; and
   means for determining the correction charge on the main correction capacitor, said determining means including means for sampling a plurality of voltage signals from the dark photosensor over time and deriving the correction charge based on a plurality of sampled voltage signals from the dark photosensor.

2. The apparatus of claim 1, wherein there exists no amplifier between the first correction capacitor and the multiplexing node, and no amplifier between the second correction capacitor and the multiplexing node.

3. The apparatus of claim 1, further comprising
   for each of the first video line and the second video line, a multiplexing transistor disposed between the correction capacitor and the multiplexing node.

4. The apparatus of claim 1, further comprising
   for each of the first video line and the second video line, means for forcing a reference voltage onto the correction capacitor.

5. The apparatus of claim 1, the determining means including means for applying a voltage related to an average of the plurality of voltage signals from the at least one dark photosensor to the correction capacitor.

6. The apparatus of claim 5, the determining means including
   an RC circuit, and
   means for transferring a plurality of voltage signals from the at least one dark photosensor to the RC circuit.

7. The apparatus of claim 1, wherein the first video line is associated with odd photosensors in a linear array, and the second video line is associated with even photosensors in a linear array.

8. A method of operating a photosensitive apparatus, the apparatus comprising:
   a first video line, having associated therewith a first set of active photosensors, each active photosensor outputting a signal representative of light intensity thereon onto the first video line;
   a second video line, having associated therewith a second set of active photosensors, each active photosensor outputting a signal representative of light intensity thereon onto the second video line;
   a multiplexing node, accepting signals from the first video line and the second video line; and
   at least one dark photosensor, the dark photosensor being adapted to receive no light thereon, outputting a reference signal onto the first video line;
   the method comprising the steps of:
   performing a first offset-correction operation on signals on the first video line;
   performing a second offset-correction operation on signals on the second video line;
   following the first and second offset-correction operations, multiplexing the signals on the first video line and the second video line at the multiplexing node;
   sampling a plurality of voltage signals from at least one dark photosensor over time; and
   performing a final offset-correction operation on signals downstream of the multiplexing node, the final offset-correction step including a main correction capacitor influencing voltage signals on the multiplexing node.

9. The method of claim 8, wherein there exists no amplifier between the first correction capacitor and the multiplexing node, and no amplifier between the second correction capacitor and the multiplexing node.

10. The method of claim 8, the offset-correction operations on the first and second video line comprising the steps of
    a first correction capacitor associated with the first video line influencing the voltage signals from the active photosensors on the first video line;
    a second correction capacitor associated with the second video line influencing the voltage signals from the active photosensors on the second video line.

11. The method of claim 10, the offset-correction operations on the first and second video line comprising the step of
    for each of the first video line and the second video line, forcing a reference voltage onto the correction capacitor.

12. The method of claim 8, further comprising the step of determining a correction charge on the main correction capacitor.

13. The method of claim 8, the determining step including applying a voltage related to an average of the plurality of voltage signals from the at least one dark photosensor to the main correction capacitor.

14. The method of claim 8, wherein the first video line is associated with odd photosensors in a linear array, and the second video line is associated with even photosensors in a linear array.

* * * * *